United States Patent [19]

Milberger

[11] 4,356,841
[45] Nov. 2, 1982

[54] MATRIX SWITCHING CONTROL OF SUBSEA PRODUCTION SYSTEMS

[75] Inventor: Lionel J. Milberger, Spring, Tex.

[73] Assignee: FMC Corporation, Chicago, Ill.

[21] Appl. No.: 101,993

[22] Filed: Dec. 7, 1979

[30] Foreign Application Priority Data

Jul. 21, 1979 [GB] United Kingdom ............... 7925529

[51] Int. Cl.$^3$ .................... F17D 3/00; F15B 21/02
[52] U.S. Cl. .................... 137/624.18; 91/1; 91/36; 92/33; 74/128
[58] Field of Search ........... 91/35, 27, 1, 39, 36; 137/624.2, 624.18; 92/31, 32, 33; 74/128

[56] References Cited

U.S. PATENT DOCUMENTS

| | | |
|---|---|---|
| 1,765,377 | 6/1930 | Marks . |
| 3,236,260 | 2/1966 | Halsey . |
| 3,703,104 | 11/1972 | Tamplen ............... 74/88 |
| 3,783,899 | 1/1974 | Fowler ............... 137/624.2 |
| 3,913,448 | 10/1975 | Priestley ............... 91/39 |
| 3,930,434 | 1/1976 | Hunter ............... 137/624.2 |
| 3,965,775 | 6/1976 | Pinkesfeld ............... 74/827 |
| 4,185,541 | 1/1980 | Milberger et al. ............... 91/526 |

Primary Examiner—Abraham Hershkovitz
Attorney, Agent, or Firm—L. B. Guernsey; W. W. Ritt, Jr.

[57] ABSTRACT

A multiple-section, multiple-position switching valve and a hydraulic powered valve actuator for controlling subsea well equipment, such as valve operators, connectors and other hydraulically actuated devices, with only two hydraulic pressure source lines from the surface to the subsea location of such well equipment. The switching valve includes a plurality of readily removable and replaceable valve sections, each having a unique combination of valve portings, which sections can be connected end to end to obtain a switching system having a predetermined matrix of switching control. The valve actuator moves the switching valve in a first direction through a sequence of distinct positions, and then reverses and moves the switching valve in the opposite direction through the same distinct positions. The switching valve includes a position indicating valve section and circuitry which are incorporated into the design and connected to one of the hydraulic pressure source lines to give a surface indication of the valve's position and that of the subsea actuator.

7 Claims, 17 Drawing Figures

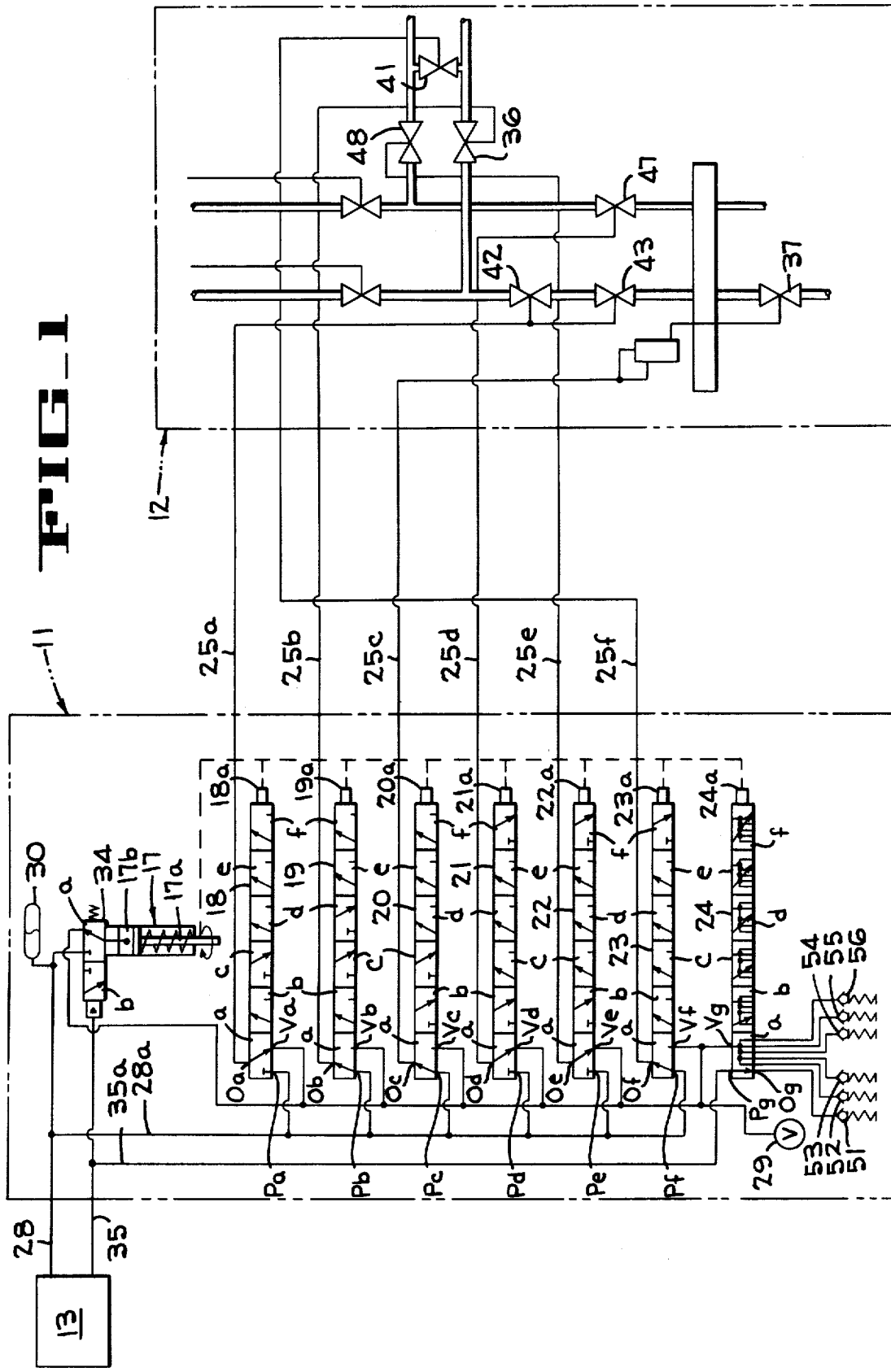
FIG_1

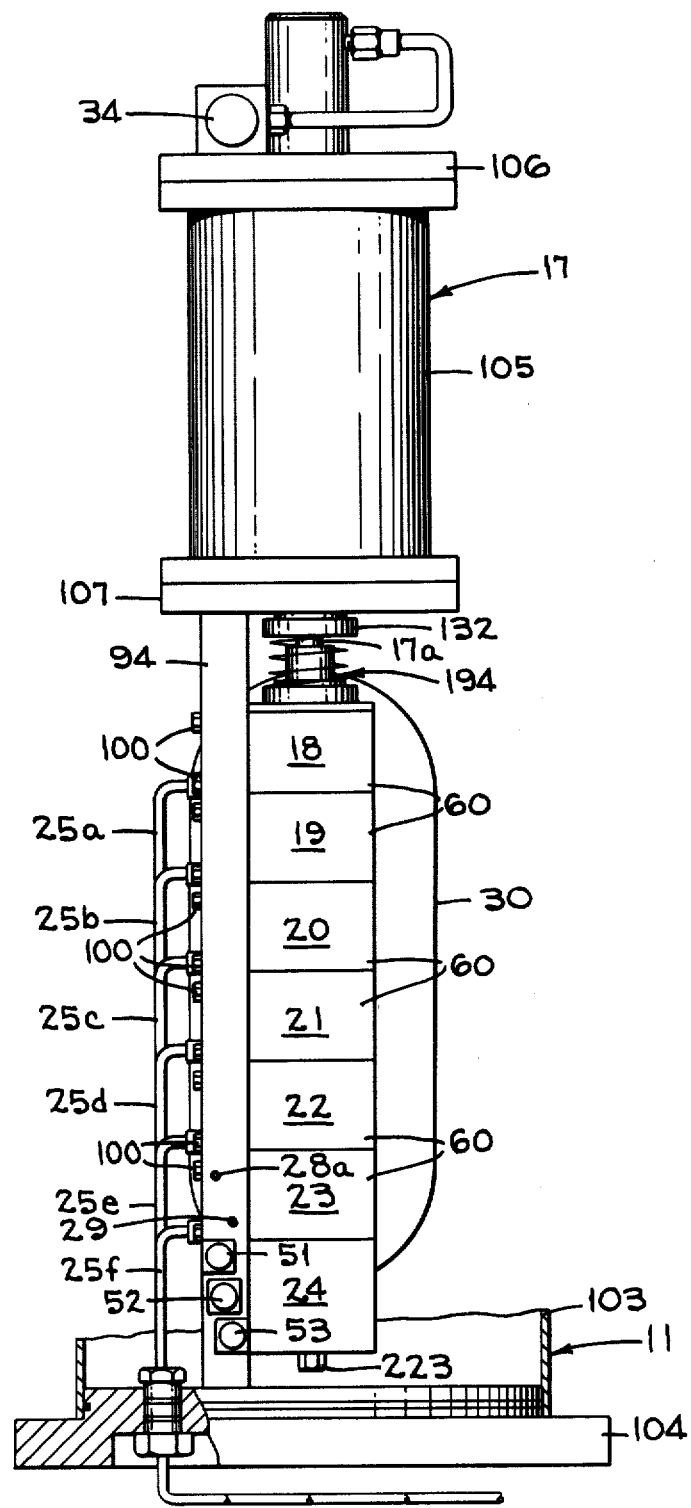
FIG_2

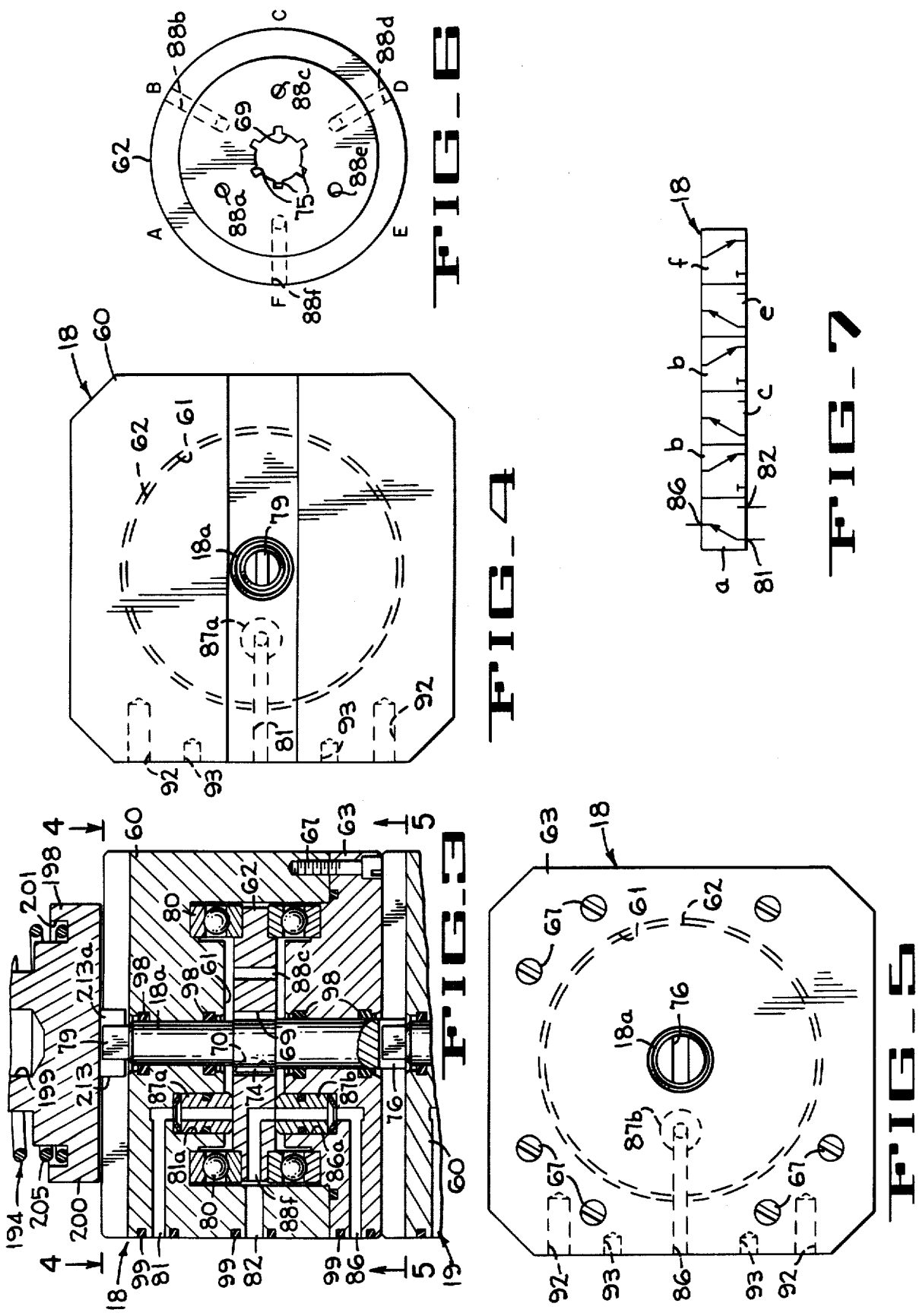

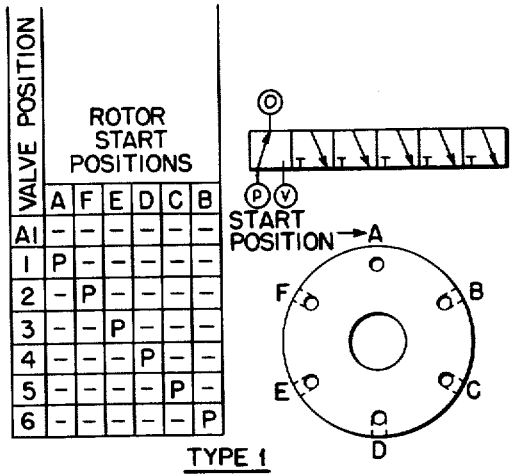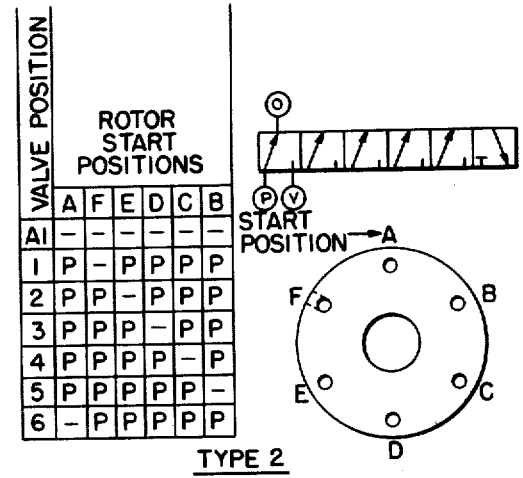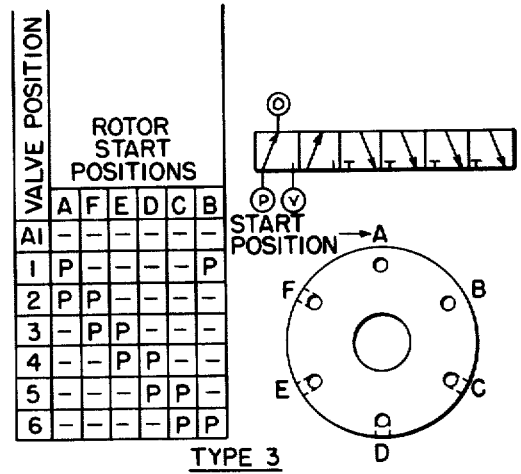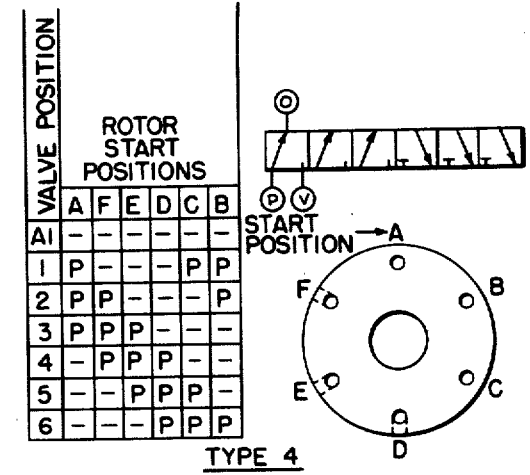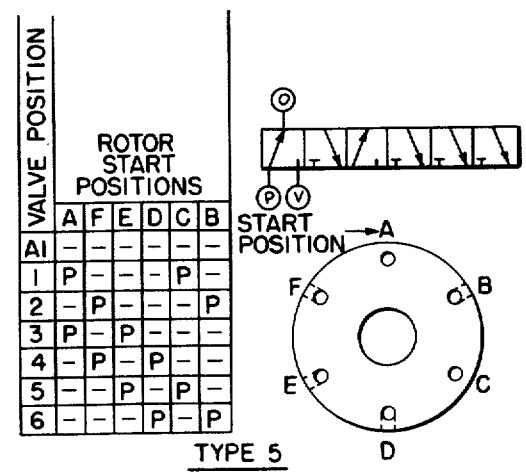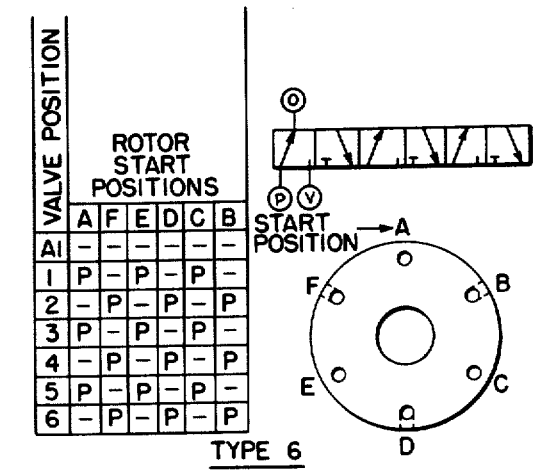
FIG_8A

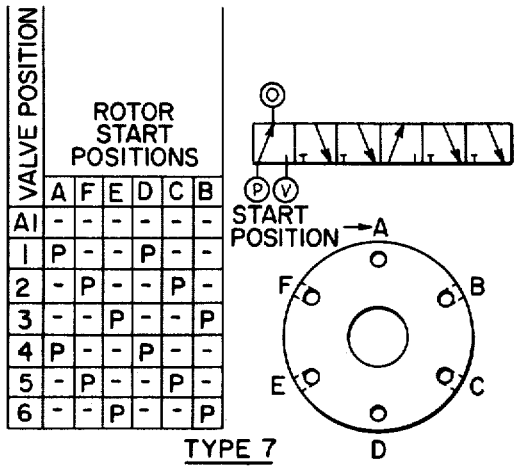
TYPE 7
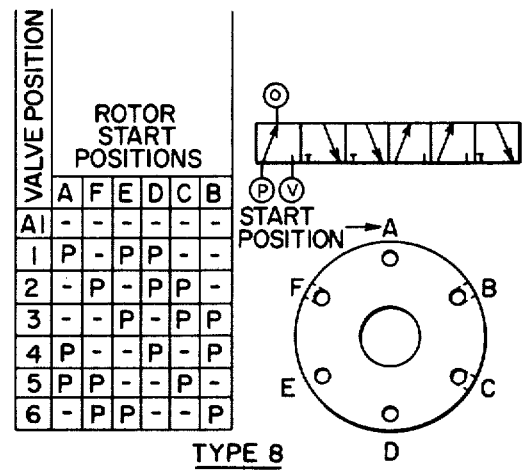
TYPE 8
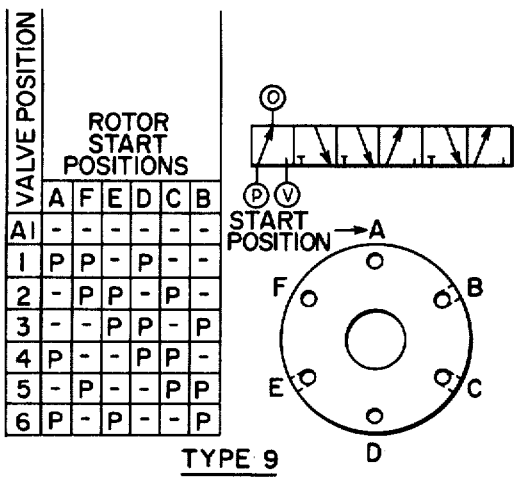
TYPE 9
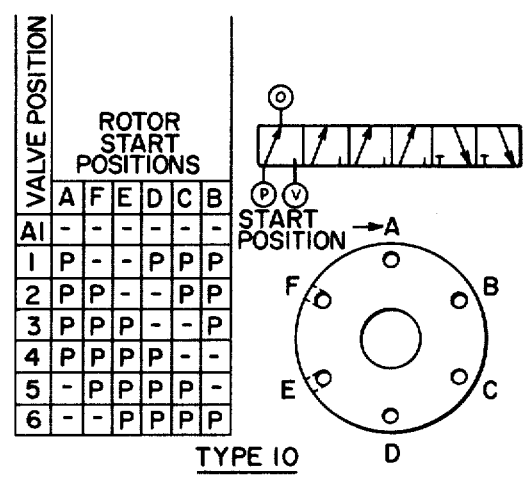
TYPE 10
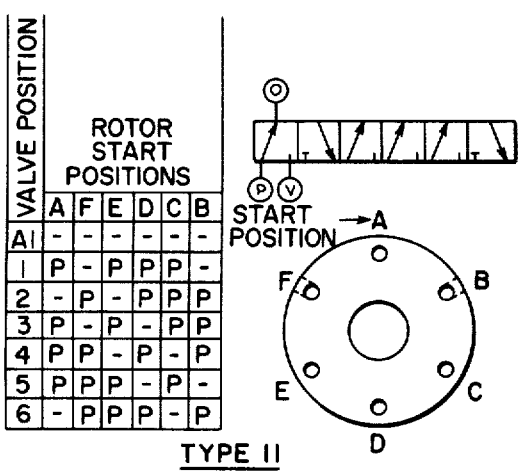
TYPE 11
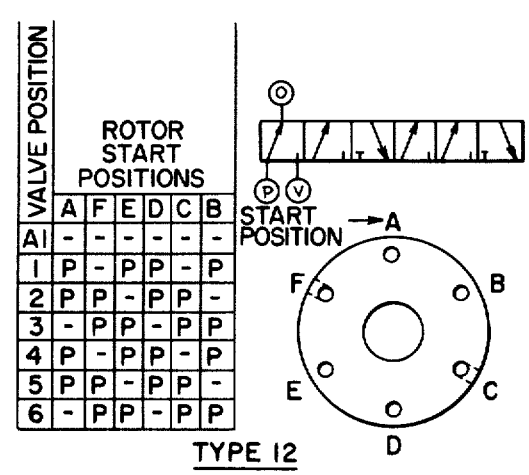
TYPE 12
FIG_8B

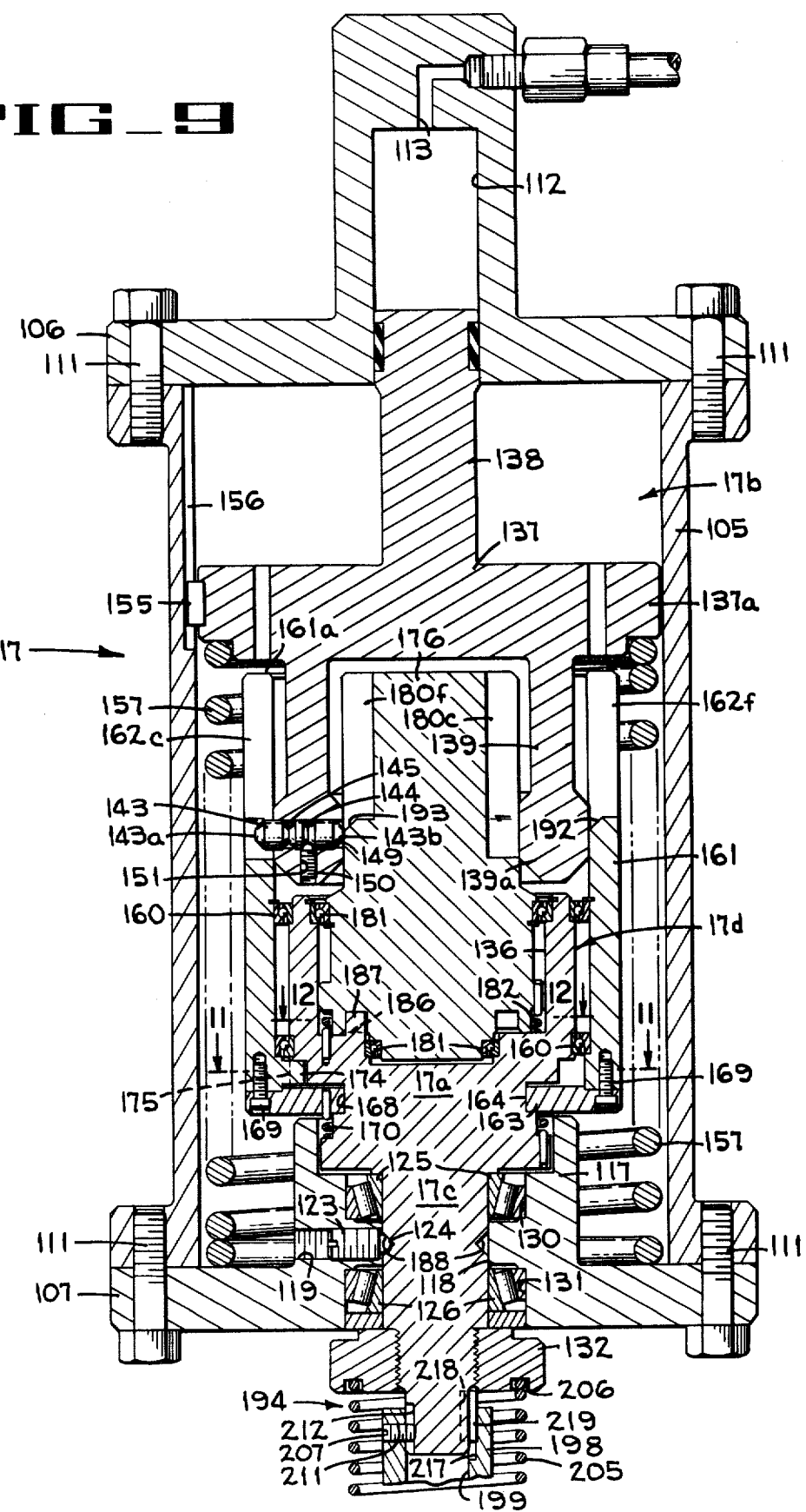

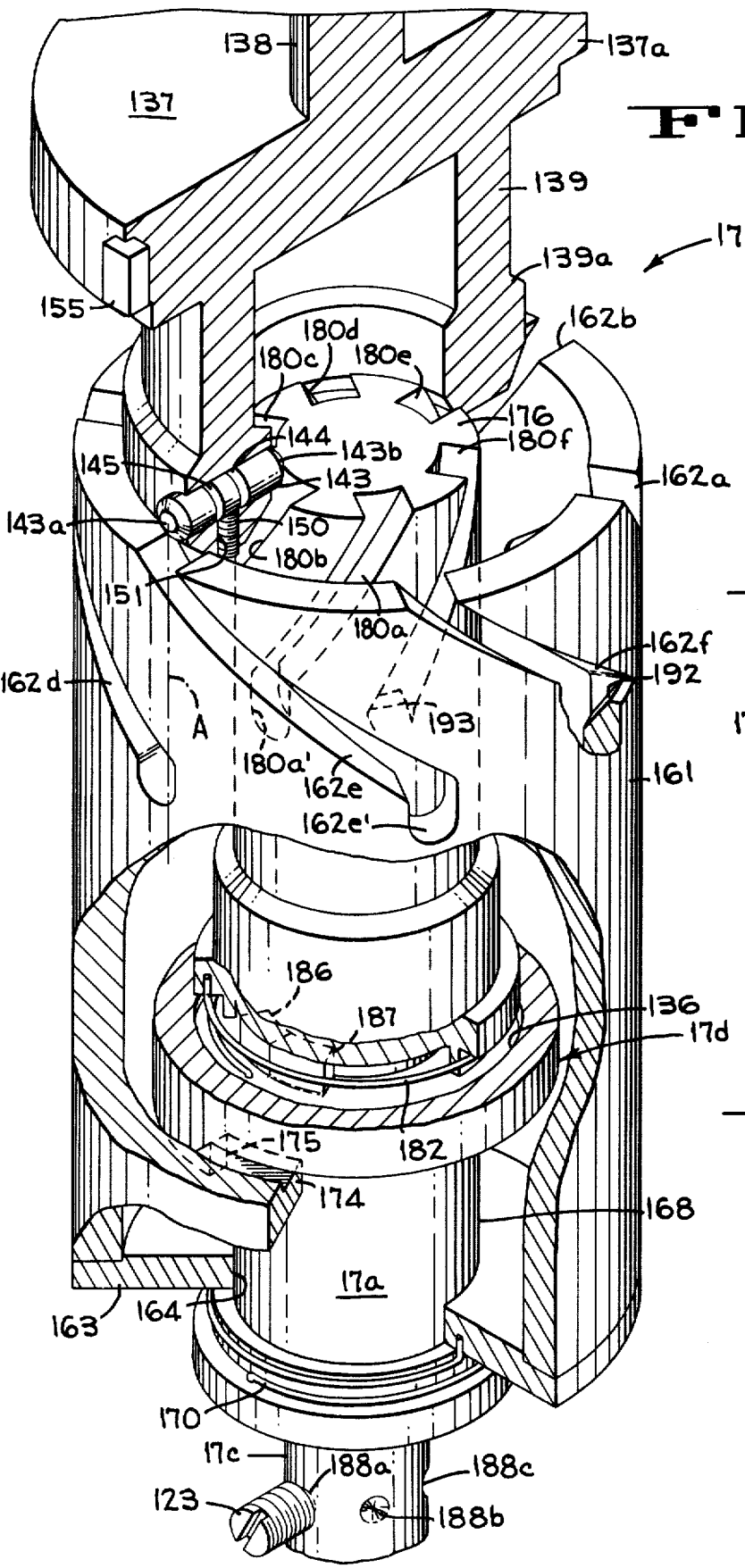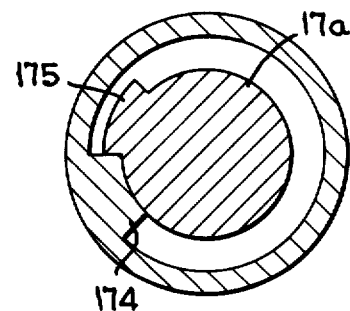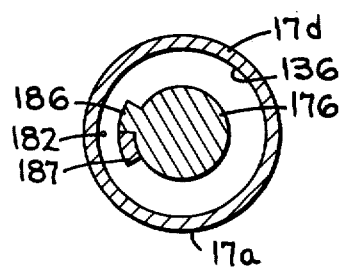

FIG_13

| OPERATING STEPS | | PRODUCTION MASTERS-42,43 | PRODUCTION WING-36 | SCSSV-37 | ANNULUS MASTER-47 | ANNULUS WING-48 | CROSSOVER-41 |
|---|---|---|---|---|---|---|---|
| 0 | SHUT-IN/ PIG FLOWLINE | C | C | C | C | C | O |
| 1 | TEST MASTER VALVE | C | O | O | C | C | C |
| 2 | TEST SCSSV | O | O | C | C | C | C |
| 3 | CLOSE MASTER VALVE AND TEST ANNULUS | C | C | C | O | O | C |
| 4 | OPEN SCSSV | O | C | O | O | O | C |
| 5 | PRODUCTION | O | O | O | O | O | C |
| 6 | PRODUCTION THRU ANNULUS LINE | O | O | O | C | C | O |
| | VALVE TYPE | 11 | 10 | 10 | 4 | 4 | 2 |

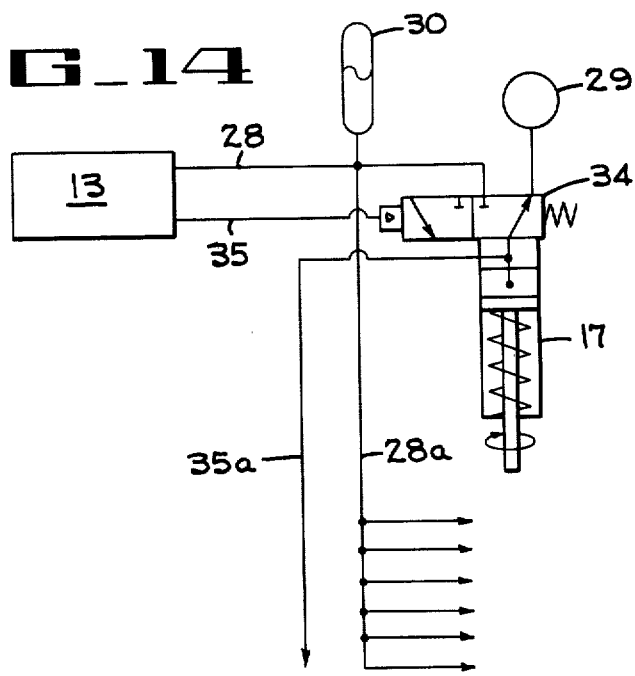
FIG_14
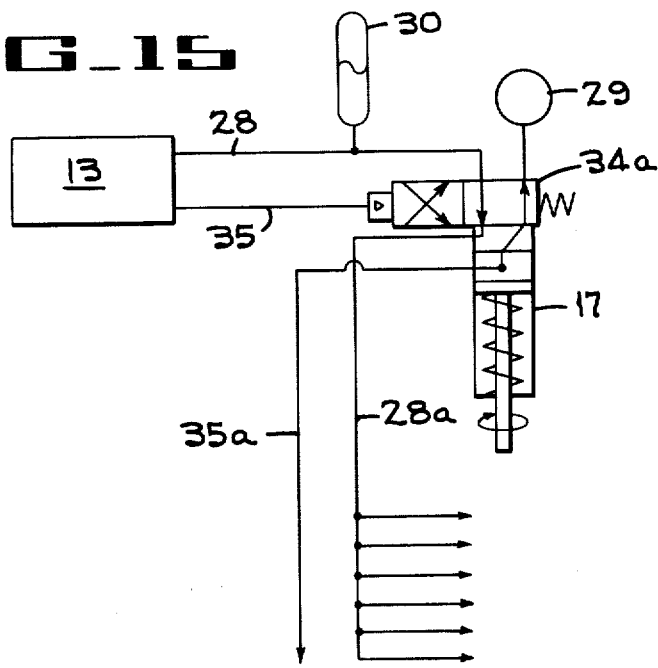
FIG_15

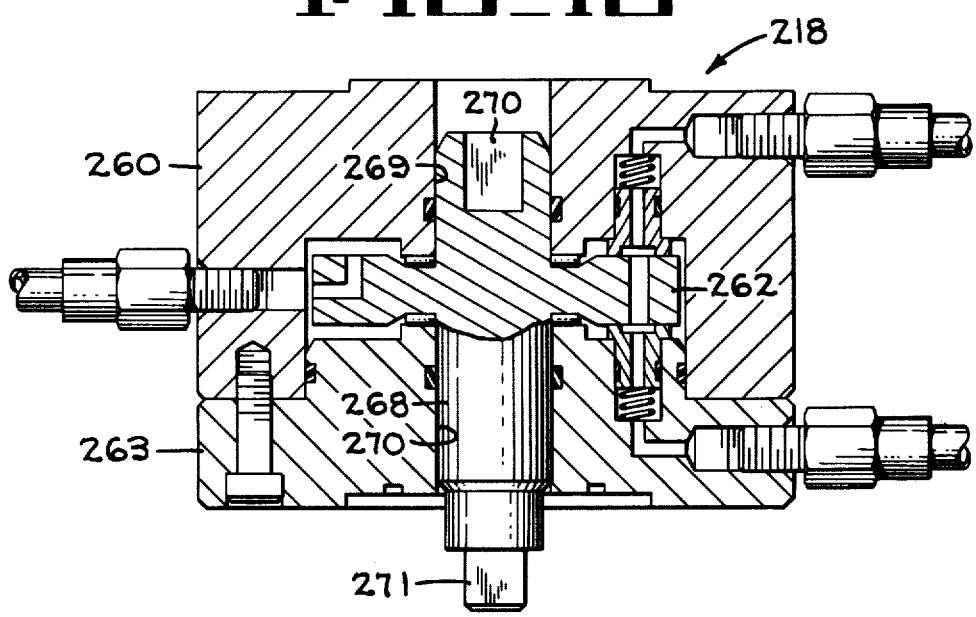

MATRIX SWITCHING CONTROL OF SUBSEA PRODUCTION SYSTEMS

BACKGROUND OF THE INVENTION

1. Field of the Invention

This invention relates to apparatus for hydraulic control of a subsea device, and more particularly to hydraulic apparatus for the control of a relatively large number of subsea devices using only a pair of hydraulic pressure source lines from a surface vessel to the sea floor.

2. Description of the Prior Art

The production of oil and gas from offshore wells has developed into a major endeavor of the petroleum industry. Wells are commonly drilled several hundred or even several thousand feet below the surface of the ocean, substantially below the depth at which divers can work efficiently. As a result, the drilling and operating of a subsea well must be controlled from a surface vessel or from an offshore platform. The testing, production and shutting down of the subsea well is regulated by a subsea christmas tree which is positioned on top of the subsea wellhead. The christmas tree includes a plurality of valves having operators which are biased to a non-active position by spring returns, and it has been found convenient to actuate these operators by hydraulic fluid which is directly controlled from a surface vessel. For this purpose, a plurality of hydraulic lines are commonly run from the surface vessel to the wellhead to open and close these valves, and to actuate other devices in the well and the wellhead during installation, testing and fluid production through the subsea well equipment, and also during workover procedures being performed on the well.

In some of the prior art systems, a separate hydraulic line is run from the surface vessel to each of the hydraulically powered devices at the sea floor. Other prior art equipment uses a single hydraulic control line to control a plurality of remotely positioned hydraulically actuated devices by employing a plurality of pilot valves each arranged for actuation by a different pressure level in the hydraulic line. A pressure indicator and a pressure regulator at the surface are used to monitor the subsea pressure level to provide actuation of the desired pilot valve. Pressure difference between the subsea floor and the surface, and variation in operating characteristics of the pilot valves because of the hostile subsea environment can cause improper operation of the remotely operated pressure sensitive devices.

Still other systems use a rotary device which sequentially moves a plurality of valves through a sequence of operating steps, from the beginning of the sequence to the end and is then set to repeat this sequence. Devices which are used for rotating a plurality of positioning apparatus through a plurality of operating positions are shown in the U.S. Pat. Nos. 3,703,104, issued to Tamplen and 3,965,775, issued to Pinkesfeld.

SUMMARY OF THE INVENTION

The present invention overcomes some of the disadvantages of the prior art systems by providing a multi-position switching valve and a valve actuator having an output member which is movable to a plurality of distinct operating positions. The operator has means for moving its output member in a first direction while sequentially stopping at each of the distinct positions, means for automatically reversing the direction of movement of the output member, and means for moving the output member in the reverse direction while sequentially stopping again, but in the reverse order, at each of the distinct positions. A hydraulic fluid line coupled between a surface control center and the actuator provides fluid pressure which increments the actuator output member by one position each time pressurized fluid is applied to the actuator. A valve connected between a subsea valve operator and the hydraulic fluid line is movably coupled to the valve actuator output member to control actuation of a subsea operator. A plurality of valve sections can be combined and operated in unison, and two hydraulic lines are sufficient to control the operation of a large number of subsea operators.

BRIEF DESCRIPTION OF THE DRAWINGS

FIG. 1 is a schematic of a switching control and valve circuitry of a subsea production system in which the apparatus of the present invention is used.

FIG. 2 is a diagrammatic side elevation, with portions broken away, of a valve and valve actuator according to the present invention.

FIG. 3 is a central vertical section of a valve section according to the present invention showing the means for connection to an adjacent valve section and to a valve actuator.

FIG. 4 is a view of the valve section taken in the direction of the arrows 4—4 of FIG. 3.

FIG. 5 is a view of the valve section taken in the direction of the arrows 5—5 of FIG. 3.

FIG. 6 is a plan view of a rotor used in the valve section of FIG. 3.

FIG. 7 is a schematic of the valve section of FIG. 3 with the rotor of FIG. 6.

FIGS. 8A and 8B illustrate the physical configuration, the schematic, and the operation characteristics of a plurality of types of valve rotors according to the present invention.

FIG. 9 is a central vertical section of the valve actuator of FIG. 2.

FIG. 10 is a diagrammatic isometric view, partly in section and with portions broken away, of a valve actuator according to the present invention.

FIG. 11 is a horizontal section taken along the line 11—11 of FIG. 9.

FIG. 12 is a horizontal section taken along the line 12—12 of FIG. 9.

FIG. 13 comprises a table which illustrates the steps of operation of a subsea christmas tree and of its flow control valves.

FIGS. 14 and 15 are additional embodiments of the hydraulic circuitry which can be used to control operation of subsea valves.

FIG. 16 is another embodiment of a valve section which can be used in the present invention.

DESCRIPTION OF THE PREFERRED EMBODIMENT

FIG. 1 diagrammatically illustrates hydraulic apparatus for controlling a plurality of valves or other subsea operators while using only a pair of hydraulic pressure source lines. The present invention as illustrated in FIG. 1 includes a control module 11 for use with a subsea christmas tree 12 having a plurality of hydraulically controlled valves with their associated valve operators. The control module 11 is connected to a surface control center 13 having the usual pressure pumps, pressure gauges and switches, none of which is shown. The control module 11 includes a rotary actuator 17 connected to a rotary switch having a plurality of rotatable valve sections 18-24 each having a pressure input Pa-Pg, an output Oa-Og, and a vent Va-Vg. Each valve section includes a plurality of positions a-f each having either the pressure input connected to the output or having the output connected to the vent. Each of the pressure inputs Pa-Pg is connected to the hydraulic supply line 28 which is provided with pressurized fluid from the control center 13, and each of the vents Va-Vg is connected to a vent 29 which is vented into the sea. An accumulator 30, which is connected to the hydraulic supply line 28, aids in providing a stabilized value of hydraulic pressure to the valve sections 18-24 and to operate the actuator 17 through a pilot valve 34. The rotary actuator 17 includes a rotatable shaft 17a which is coupled to a plurality of rotatable shafts 18a-24a of the valve sections 18-24.

When a hydraulic pilot line 35 is unpressurized the pilot valve 34 is in the position shown in FIG. 1 wherein upper chamber 17b of the actuator 17 is connected to the vent 29 through the valve section a, whereby the actuator shaft 17a and the valve sections 18-24 remain in a stationary position. When pressure is admitted to the hydraulic pilot line 35 the spool of the valve 34 shifts so that liquid from the hydraulic supply line 28 is coupled through the section b of the pilot valve 34 to the upper chamber 17b, causing the actuator 17 to rotate the valve sections 18-24 to another distinct position. When the valves 18-24 are in the positions shown in FIG. 1, hydraulic pressure from the hydraulic supply line 28 is coupled through portion a of valve 19 through a hydraulic line 25b to a production wing valve 36, causing the wing valve to open. Hydraulic fluid coupled through portion a of valve 20 and portion a of valve 23 through hydraulic lines 25c, 25f also causes a downhole safety valve 37 and a crossover valve 41 to open. An upper master valve 42 and a lower master valve 43 are connected to vent 29 through hydraulic line 25a and the portion a of valve 18, and an annulus master valve 47 and an annulus wing valve 48 are connected to the vent 29 by lines 25d, 25e through the portions a of valve section 21 and 22, respectively.

The lowermost valve 24 and a plurality of pressure relief valves 51-56 provide a predetermined upper value of pressure on the pilot line 35 at the control center to indicate the position of the valve 24, thereby also indicating the position of the rotary actuator 17 and of the other valve 18-23. For example, when all the 50 valves are in their a positions, the pressure relief valve 51 is connected through the portion a of valve 24 to the pilot line 35 and limits the maximum pressure on the pilot line to 1000 psi. When the valves are all in their b positions the pressure relief valve 52 limits the pressure on the pilot line 35 to 1400 psi, thereby indicating that the valves and the actuator are in said b positions.

FIGS. 14 and 15 disclose other embodiments of circuits for interconnecting the actuator pilot valve 34, the actuator 17 and the valve sections. In FIG. 14 the position signal line 35a is connected to the supply line 28 through the portion b of the pilot valve 34 so that the pressure on line 28 can be used to determine the rotary position of the valve sections 18-24 during the time when the pilot valve 34 is energized. When the pilot valve 34 is deenergized the signal line 35a is connected to the vent 29. The hydraulic supply line 28 is always connected to the valve section just as shown in FIG. 1.

The hydraulic supply line 28 of FIG. 15 is connected to a feed line 28a when the pilot valve 34 is deenergized. When the pilot line 35 of FIG. 15 is energized the supply line 28 is disconnected from the feedline 28a thereby allowing the rotary position of the valves to be indicated by the pressure on line 28 and disconnecting the christmas tree valves until the pilot valve 34 is again deenergized.

The valve sections 18-24 are individually removable units which can be stacked in an end-to-end manner as shown in FIG. 2, with the shaft 17a of the actuator 17 connected to the shaft 18a of the uppermost valve section 18, and with each of the other valve sections having a shaft connected to the shaft of the valve section positioned immediately above it. Each of the valve sections includes a body 60 (FIG. 3) having a generally cylindrical chamber 61, with a generally disc shaped rotor 62 mounted therein and a cover 63 connected to the body 60 by a plurality of cap screws 67. The rotor 62 is rotatably mounted in the chamber 61 by the shaft 18a which is pressed into a bore 69 in the rotor (FIGS. 3,6). The rotor is connected to the shaft and retained in any one of six positions (FIG. 6) thereon by a key 70 (FIG. 3) which resides partially in a slot 74 in the shaft, and partially in any one of the six slots 75 in the rotor 62. One end of the shaft 18a includes a female slot 76 (FIG. 5), and the other shaft end includes a mating male projection 79 (FIG. 4). When the valve sections are stacked, the male projection 79 on the upper end of one shaft fits into the female slot 76 on the lower end of an adjacent valve section to interconnect the sections for unitary rotation of their shafts and rotors.

A plurality of ball or other suitable bearings 80, mounted between the rotor 62, the body and the cover 63, relieve strain at the connection between the shaft and the rotor. The valve section (FIG. 3) includes a right angle pressure port 81 and a vent port 82 drilled radially in the body, and a right angle outlet port 86 in the cover 63. A pair of shear seals 87a,87b are mounted in an enlarged portion 81a, 86a of the ports 81,86 to provide a fluid-tight seal between the ports and the rotor.

The rotor 62 (FIGS. 3, 6) includes a plurality of holes 88a-88f drilled in either a straight-line pattern or a right angle pattern. When any one of the right angle holes 88b,88d and 88f are rotated adjacent the shear seals 87a,87b the outlet port 86 is connected to the vent port 82 as shown in FIG. 3. When any one of the straight line holes 88a, 88c and 88e are rotated adjacent the shear seals the pressure port 81 is connected directly to the outlet port 86. The drilling pattern of the rotor shown in FIG. 6 is shown schematically in FIG. 7.

A plurality of threaded mounting bores 92 (FIGS. 4,5) and a plurality of dowel pin holes 93 facilitate mounting the valve sections to a manifold 94 (FIG. 2). A plurality of seals 98 provide sealing around the shaft 18a, and a plurality of seals 99 provide fluid tight connections between the pressure ports 81, the vent port 82, the outlet port 86 and the connections on the manifold 94. A seal 101 provides a fluid tight connection between the body 60 and the cover 63.

In order to control a plurality of subsea valves in a desired sequence it may be necessary to provide a unique pattern of straight-through and right angle holes for the rotors of each of the valve sections. For example, to control the subsea tree 12 of FIG. 1 the sequence of operation shown in the matrix of FIG. 13 may be used. In the shut-in position, with the supply line 28 and the pilot line 35 unpressurized, the crossover valve 41 (FIG. 1) is open, as represented by the letter O (FIG. 13), and all the other valves are closed, as represented by the letter C. In the example shown in FIG. 13, the valves 42,43 are closed in steps 0, 1 and 3, and are open in steps 2 and 4–6. This requires a rotor with the pattern of straight-through and angular holes shown in type No. 11 of FIG. 8B, and with the rotor starting in the F position in order to provide pressure to the valves 42,43 in steps 2 and 4–6. This can be done by positioning and locking the rotor 62 on the shaft 18a (FIGS. 3, 6), with the right angle hole F at the shaft's No. 1 position. A type 10 valve rotor (FIG. 8B) with the right angle hole E at the No. 1 shaft position, is required to control the valve 36. Proper positioning of the twelve rotor types of FIGS. 8A and 8B with respect to the actuator drive shaft facilitates operation of the tree 12 in a six-step manner, and also all possible combinations of sequences of operations of the valves. Other combinations, and/or specially drilled rotors, are not required when the twelve basic rotor types shown in FIGS. 8A and 8B are used. In a system where a different number of steps of operation are required, a different number of holes can be spaced around the rotor, and the rotors rotated a different number of degrees as each step of the operation is carried out.

The manifold 94 (FIG. 2) is mounted on a base plate 104, and includes a plurality of internal passageways (not shown) which connect the ports 81, 82, 86 of the valve sections 18–23 to the various hydraulic lines, such as the supply line 28, pilot line 35 and output lines 25a–25f of FIG. 1, and connect the pressure relief valves 51–56 to the valve section 24. The valve sections 18–24 (FIG. 2) are secured to the manifold 94 by a plurality of cap screws 100 which are threaded into bores 92 (FIGS. 4, 5) in the valve bodies 60. The actuator 17 is fixed to the upper end of the manifold 94. A housing 103, sealed to the base plate 104 by a seal 108, provides fluid-tight protection to the actuator 17 and valve assembly.

The actuator 17 (FIGS. 9–12) includes a generally cylindrical tubular housing 105 having a pair of end plates 106,107 connected thereto by a plurality of cap screws 111. The upper end plate 106 includes an axially extending fluid chamber 112 and a right angle port 113 extending between the upper end (FIG. 9) of the fluid chamber and a hydraulic line 109. The lower end plate 107 includes an axial flange 117 and an axial bore 118 extending through the center of the end plate. A spring loaded detent 123, having a ball-shaped portion 124 at the radial inner end thereof, resides in a radial hole 119.

The cylindrical actuator shaft 17a includes a lower portion 17c mounted in the axial bore 118. A pair of roller bearing assemblies 125,126, mounted in a pair of recesses 130,131 of the lower end plate 107, rotatably mount the shaft to the lower end plate. The lower portion of the actuator shaft is threaded to a nut 132. The shaft 17a includes an enlarged upper portion 17d having an axially extending bore 136.

An axially movable plunger 137 (FIGS. 9, 10) is located in the upper end of the housing 105, and this plunger includes a piston 138 extending upwardly into the fluid chamber 112 of the upper end plate 106, and a radial flange 137a extending to the wall of the housing 105. The lower portion of the plunger 137 includes a sleeve 139 having a radially expanded portion 139a. A cylindrical pin 143, having a pair of circumferentially extending grooves 144, 145, is mounted in a radial bore 149 in the expanded sleeve 139a. A spring detent 150 (FIGS. 9, 10), mounted in a radial bore 151 (FIG. 9), intersects the pin 143 and rests in one of the grooves 144, 145. A key 155 (FIGS. 9, 10), connected to the plunger 137 and riding in an axial slot 156 in the housing 105, prevents rotational movement of the plunger 137 but allows vertical movement thereof relative to the housing. A coil spring 157 (FIG. 9), connected between the lower end plate 107 and the radial flange 137a, biases the plunger in an upward direction, so that in the absence of hydraulic pressure on the upper end of the piston 138 the plunger flange 137a moves upward to rest against the upper end plate 106.

A hollow cylindrical outer cam 161 (FIGS. 9, 10), having six angular slots 162a–162e (only five shown) spaced about the upper portion thereof, is rotatably mounted around the upper portion 17c of the actuator shaft 17a by a plurality of bearings 160. The outer cam also includes an additional angled slot which is not shown due to the problem of cluttering the drawings with too many details. A plate 163, having an axial bore 164, is mounted in an annular groove 168 (FIG. 9) in the shaft 17a and secured to the outer cam by a plurality of cap screws 169. The lower portion of the diagrammatic drawing of FIG. 10 has been stretched to better show other details, so the groove 168 in FIG. 10 appears to be much wider than the same groove as shown in the sectional view of FIG. 9. A torsion spring 170 (FIGS. 9, 10) is connected between the shaft 17a and the outer cam 161 to bias a radial inward cam lug 174 (FIGS. 10, 11) toward a radial outward shaft lug 175. The rotation of outer cam 161 about the shaft 17a is limited to an arc of less than 360 degrees by the lugs 174, 175.

A cylindrical inner cam 176 (FIGS. 9, 10, 12), having a plurality of angular slots 180a–180f spaced about the upper portion (FIG. 10) thereof, is rotatably mounted in the axial bore 136 of the shaft 17a by a plurality of bearings 181. The slots 180a–180f (FIG. 10) are angled clockwise as they extend downward from the top of the inner cam 176, in contrast to the slots 162a–162e of the outer cam 161 which are angled counterclockwise as they extend downward. A torsion spring 182 (FIGS. 9, 10) is connected between the shaft 17a and the inner cam 176 to bias a radial outward cam lug 186 (FIGS. 10, 12) toward a radial inward shaft lug 187.

The actuator shaft 17a is normally retained in one of six rotary positions by the detent 123 (FIGS. 9, 10) extending into one of a plurality of shallow bores 188 in the lower portion 17c of the shaft 17a. As stated above, the number of rotary positions of the shaft and of the valve sections can be changed to a greater or lesser number as required. When the fluid chamber 112 (FIG. 9) is unpressurized the plunger 137 is biased to the upper end of the housing 105 with the pin 143 slightly above the upper end 161a of the outer cam 161, and with one end of the pin 143 (FIG. 10) radially above the open end of one of the outer cam slots 162a–162e and the other end of the pin 143 radially above the open end of one of the inner cam slots 180a–180f.

When the pin or cam follower 143 (FIG. 10) is positioned radially outward with the outward end 143a immediately above the open end of one of the outer cam slots 162a–162e, the detent 150 is positioned in the groove 144 to retain the pin in the outer cam slot. When pressurized fluid is admitted through the port 113 to the fluid chamber 112, the plunger 137 (FIGS. 9, 10) is moved axially downward forcing the pin 143 downward in the adjacent slot, with the pin moving along the radially extending line A (FIG. 10), as the plunger is prevented from rotating by the key 155 in the slot 156 (FIG. 9). For example, when the pin 143 moves down into the slot 162e, the pin 143 progresses downward along the line A until it reaches the lower end 162e' of the slot causing the outer cam 161 to rotate 60 degrees clockwise (as viewed from above the actuator). Clockwise rotation of the cam 161 and the cam lug 174 causes the shaft lug 175 (FIG. 11) and the shaft 17a to rotate 60 degrees clockwise and for the detent 123 to move from bore 188a (FIG. 10) into the adjacent detent bore 188b.

When pressure is released from the chamber 112 (FIG. 9) the plunger 137 is forced upward by the coil spring 157, moving the pin 143 (FIG. 10) upward along the line A, in the slot 162e and rotating the outer cam 60 degrees counterclockwise. The shaft 17a is prevented from rotating by the detent 123 in the bore 188b and the cam lug 174 (FIG. 11) is rotated counter clockwise away from shaft lug 175. The counterclockwise rotation of the outer cam 161 "winds" the torsion spring 182 (FIGS. 9, 10) to bias the outer cam lug 174 more strongly toward the shaft lug 175. When the pin 143 moves out of the open end of the slot 162e the spring 170 causes the cam 161 to quickly rotate 60 degrees clockwise, with the upper end of the cam slot 162f stopping adjacent the pin 143, as the outer cam lug 174 contacts the shaft lug 175. This same sequence is repeated each time the plunger moves down and returns to the upper position, with the outer cam and shaft rotating 60 degrees clockwise as the pin 143 moves down to the bottom of a cam slot, the shaft is stopped and held in place by the detent 123 while the pin moves upward, rotates the outer cam counterclockwise and winds up the tension spring. When the pin 143 moves above the outer cam the cam snaps around clockwise with the pin adjacent another open end of another slot. This causes the shaft to rotate in increments between six distinct stopping points.

When the pin 143 reaches the lower end of the last cam slot 162f the radial outer end of the pin is pressed against a bevelled surface 192 (FIGS. 9, 10) causing the pin 143 to move radially inward with the end 143b of the pin in the lower end 180a' of the cam slot 180a in the inner cam 176. The detent 150 moves into the groove 145 of the pin to retain the pin in the slot 180a as the pin 143 and the plunger 137 move upward. Each time the plunger moves downward the pin 143 moves downward in one of the inner cam slots 180a-180f, with the pin moving along a line parallel to line A (FIG. 10) causing the inner cam 176 to rotate counterclockwise 60 degrees. The radial outward lug 186 on the inner cam 176 presses against the radial inward lug 187 on the shaft 17a (FIG. 12) causing the shaft to rotate counterclockwise and to move the detent 123 (FIG. 10) into an adjacent bore 188a-188f (only part of which are shown) on the shaft 17a. An upward movement of the plunger 137 and the pin 143 causes the inner cam 176 (FIG. 12) to rotate clockwise to move the lug 186 away from the lug 187 and "wind" the torsion spring 170 (FIGS. 10, 12) to bias the inner cam lug 186 more strongly toward the shaft lug 187. When the pin 143 moves upward, out of the open end of one of the slots 180a-180f, the torsion spring 182 causes the cam 176 to quickly rotate 60 degrees counterclockwise with the upper end of the next cam slot stopping adjacent the pin 143, as the inner cam lug 186 contacts the shaft lug 187. Repeating the sequence causes the shaft 17a to rotate counterclockwise in increments between each of six distinct stopping points.

When the pin 143 reaches the lower end of the last cam slot 180f (FIGS. 9, 10) the radial inner end 143b of the pin is pressed against a bevelled surface 193 causing the pin 143 to move radially outward into the lower end of the cam slot 162a and to again reverse the direction of rotation of the actuator shaft whenever the plunger 137 is moved downward. The shaft rotates through six positions in one direction, then automatically reverses the direction of rotation, and moves in reverse order through the same six positions. This process is automatically repeated as long as the plunger moves down and back up.

The actuator 17 is connected to the stacked valve sections 18-24 by a spring loaded coupling means 194 (FIGS. 2, 3, 9) comprising a generally cylindrical coupler 198 having an axial bore 199 extending downward through a portion of the coupler. A radial flange portion 200 includes an annular groove 201 (FIG. 3) with one end of a compression spring 205 mounted in the groove 201 and the other end of the spring connected to an annular groove 206 in the nut 132 (FIG. 9) to bias the coupler 198 toward the valve section 18 (FIG. 2). The coupler 198 is secured to the lower end 17c of the actuator shaft 17a (FIG. 9) by a set screw 207 mounted in a radial threaded hole 211 in the coupler and with the radial inner end of the set screw extending into an axial slot 212 in the shaft 17a. The slot 212 and set screw 207 allow the coupler 198 to travel axially along the shaft 17a through a distance determined by the vertical length of the slot 212. The lower end of the coupler includes a shaft 213 (FIG. 3) having a radial slot 213a to receive the rectangular projection 79 on the upper end of the valve shaft 68 (FIGS. 3, 4) and to secure the shaft 18a of the upper valve section 18 to the shafts 213 and 17a. A slot 217 in the upper portion of the coupler 198 and a slot 218 in the lower end of the actuator shaft 17a (FIG. 9) contain a key 219 which couple rotational motion from the shaft 17a to the coupler 198.

The purpose of the coupling means 194 is to couple the actuator shaft 17a to the shaft 18a of the valve sections 18-24 during normal operation of the actuator 17. If the actuator should fail, the coupler 198 (FIG. 2) can be pried upward from the valve section 18 by an appropriate tool until the shaft 213 (FIG. 3) of the coupler is disconnected from the shaft 18a of the upper valve section. A nut 223 (FIG. 2) extending from the lower end of the valve 24 and connected to the valve shaft 24a can be turned by an appropriate wrench to rotate the shaft 24a and temporarily operate the valves 18-24.

Another embodiment 218 of the valve sections 18-24 (FIG. 2) is disclosed in FIG. 16 with most of the elements functioning in a manner similar to the embodiment shown in FIGS. 3-6. However, a rotor 262 and a shaft 268 are fixed together and the rotor cannot be removed and positioned in a different rotary position on the shaft as in the valve section of FIG. 3. The rotor 262 is supported by the shaft 268 which rotates in a bore 269 in the valve body 260 and in a bore 270 in a cover 263. The upper end of the shaft 262 includes a square hole 270 and a square shaft end 271 on the other end. Several of the valve sections 218 can be stacked with the square end 271 of one valve shaft fitting into the square hole 270 in the shaft of an adjacent valve section. These stacked valve sections 218 can be connected to a single actuator as shown in FIG. 2, but individual sections cannot be removed or replaced without disconnecting the sections mounted below the section being removed.

The present invention discloses apparatus for remote control of a relatively large number of hydraulically-operated subsea operators using only two hydraulic lines between a surface control center and a subsea device containing the operators. A valve actuator having a rotatable shaft or other output member which is movable to a plurality of distinct operating positions is coupled to a plurality of valves which are used to control the subsea operators. The valve actuator includes means for automatically reversing the direction of movement, so the valve is moved in a first direction through a sequence of distinct positions and then moved in a reverse direction through the same distinct positions.

Although the best mode contemplated for carrying out the present invention has been herein shown and described, it will be apparent that modification and variation may be made without departing from what is regarded to be the subject matter of the invention as defined in the appended claims.

What is claimed is:

1. Apparatus for remote control of a relatively large number of hydraulically-operated subsea operators using only two hydraulic lines between a surface control center and a subsea device containing said operators, said apparatus comprising:
   a valve actuator having an axially movable input member and a rotatable output member, said output member being rotatable to a plurality of distinct operating positions;
   means for moving said actuator output member in a first rotational direction in response to an axial movement of said input member, said output member stopping at at least two of said distinct positions;
   means for moving said actuator output member in a second rotational direction in response to an axial movement of said input member, said output member stopping at at least two of said distinct positions;
   means for automatically reversing the direction of rotation of said actuator output member when said actuator output member has moved through a predetermined number of said distinct positions;
   means for incrementing said actuator output member by one position by applying hydraulic pressure to said actuator input member;
   a plurality of valve means each having an input and an output;
   means for coupling each of said valve means to said actuator output member; and
   position indicator means to indicate the position of said actuator output member.

2. Apparatus for remote control as defined in claim 1 including means for connecting said position indicator to one of said hydraulic lines to couple a position indicating signal from said position indicator to said control center.

3. Apparatus for remote control as defined in claim 1 wherein said position indicator means is connected to said actuator output member.

4. Apparatus for remote control as defined in claim 1 wherein said position indicator includes a plurality of hydraulic relief valves connected to one of said valve means.

5. Apparatus for remote control as defined in claim 1 wherein said means for reversing includes means for reversing the direction of movement of said actuator output member each time said actuator output member reaches a predetermined position.

6. Apparatus for remote control as defined in claim 1 wherein said means for reversing includes means for moving said actuator output member between a first and a second end position and for reversing the direction of movement of said actuator output member each time said actuator output member reaches one of said first and said second end positions.

7. Apparatus for remote control of a relatively large number of hydraulically-operated subsea operators using only two hydraulic lines between a surface control center and a subsea device containing said operators, said apparatus comprising:
   a valve actuator having an output member rotatable to a plurality of distinct operating positions in response to an axial movement of an input member;
   means for rotating said actuator output member in a first direction in response to said axial movement of said input member, said output member stopping at at least two of said distinct positions;
   means for rotating said actuator output member in a second direction in response to said axial movement of said input member, said output member stopping at at least two of said distinct positions;
   means for automatically reversing the direction of rotation of said actuator output member when said actuator output member has moved through a predetermined number of said distinct positions;
   means for incrementing said actuator output member by one position by applying hydraulic pressure to said input member of said actuator;
   a plurality of valve means each having an input and an output; and
   means for coupling each of said valve means to said actuator output member.

* * * * *